United States Patent
Duggi et al.

(10) Patent No.: US 7,672,307 B2
(45) Date of Patent: Mar. 2, 2010

(54) APPARATUS AND METHOD FOR TRANSPARENT LAYER 2 ROUTING IN A MOBILE AD HOC NETWORK

(75) Inventors: Mohan R. Duggi, Garland, TX (US); Gowri Shankar, Garland, TX (US); Sudhindra P. Herle, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 1036 days.

(21) Appl. No.: 10/764,130

(22) Filed: Jan. 23, 2004

(65) Prior Publication Data

US 2005/0041628 A1 Feb. 24, 2005

Related U.S. Application Data

(60) Provisional application No. 60/497,271, filed on Aug. 22, 2003.

(51) Int. Cl.
*H04L 12/28* (2006.01)
*H04J 3/24* (2006.01)

(52) U.S. Cl. ..................... 370/392; 370/349

(58) Field of Classification Search ............. 370/338, 370/389, 392, 349, 401; 709/238, 240, 242, 709/243

See application file for complete search history.

(56) References Cited

U.S. PATENT DOCUMENTS

| | | | |
|---|---|---|---|
| 6,292,838 B1 * | 9/2001 | Nelson | 709/236 |
| 6,535,498 B1 | 3/2003 | Larsson et al. | |
| 6,621,805 B1 * | 9/2003 | Kondylis et al. | 370/329 |
| 6,628,620 B1 | 9/2003 | Cain | |
| 6,718,394 B2 | 4/2004 | Cain | |
| 6,728,232 B2 | 4/2004 | Hasty, Jr. et al. | |
| 6,757,281 B1 * | 6/2004 | Irish | 370/389 |
| 6,763,013 B2 * | 7/2004 | Kennedy | 370/338 |
| 6,763,014 B2 * | 7/2004 | Kennedy | 370/338 |
| 6,765,896 B1 * | 7/2004 | Ahmed et al. | 370/338 |
| 6,771,666 B2 | 8/2004 | Barker, Jr. | |
| 6,870,846 B2 | 3/2005 | Cain | |
| 6,894,985 B2 * | 5/2005 | Billhartz | 370/252 |
| 6,937,602 B2 | 8/2005 | Whitehill et al. | |
| 6,940,832 B2 * | 9/2005 | Saadawi et al. | 370/328 |
| 6,975,614 B2 * | 12/2005 | Kennedy | 370/338 |
| 6,982,982 B1 | 1/2006 | Barker, Jr. et al. | |
| 6,985,476 B1 * | 1/2006 | Elliott et al. | 370/349 |
| 7,027,426 B2 * | 4/2006 | Billhartz | 370/338 |
| 7,082,117 B2 * | 7/2006 | Billhartz | 370/338 |

(Continued)

FOREIGN PATENT DOCUMENTS

CA 2 361 707 A1 8/2000

(Continued)

*Primary Examiner*—George Eng
*Assistant Examiner*—Christopher M Brandt (57) ABSTRACT

For use in a mobile ad hoc network (MANET), a first MANET node for routing data packets using Layer 2 information. The first MANET node comprises: 1) a radio frequency (RF) transceiver for wirelessly communicating with other MANET nodes; and 2) a controller for receiving incoming data packets from the RF transceiver and sending outgoing data packets to the RF transceiver. The controller receives a first data packet from an Internet protocol (IP) layer associated with the first MANET node, determines a first medium access control (MAC) layer address associated with the first data packet, and adds the first MAC layer address to the first data packet.

20 Claims, 4 Drawing Sheets

U.S. PATENT DOCUMENTS

| | | | |
|---|---|---|---|
| 2002/0013858 A1* | 1/2002 | Anderson | 709/245 |
| 2002/0039357 A1 | 4/2002 | Lipasti et al. | |
| 2002/0067736 A1* | 6/2002 | Garcia-Luna-Aceves et al. | 370/442 |
| 2002/0191573 A1* | 12/2002 | Whitehill et al. | 370/338 |
| 2003/0123419 A1 | 7/2003 | Rangnekar et al. | |
| 2003/0202512 A1* | 10/2003 | Kennedy | 370/389 |
| 2003/0204623 A1 | 10/2003 | Cain | |
| 2003/0204625 A1 | 10/2003 | Cain | |
| 2003/0212821 A1* | 11/2003 | Gillies et al. | 709/238 |
| 2003/0236916 A1* | 12/2003 | Adcox et al. | 709/245 |
| 2004/0028016 A1* | 2/2004 | Billhartz | 370/338 |
| 2004/0042434 A1* | 3/2004 | Kennedy | 370/338 |
| 2004/0057409 A1* | 3/2004 | Kennedy | 370/338 |
| 2004/0156346 A1* | 8/2004 | O'Neill | 370/338 |
| 2005/0013253 A1* | 1/2005 | Lindskog et al. | 370/238 |
| 2005/0169254 A1* | 8/2005 | Kurita et al. | 370/352 |
| 2006/0104301 A1* | 5/2006 | Beyer et al. | 370/445 |

FOREIGN PATENT DOCUMENTS

| | | |
|---|---|---|
| CA | 2 422 201 A1 | 3/2002 |
| CN | 1417992 A | 5/2003 |
| JP | 2001-274815 | 10/2001 |
| JP | 2002-354016 | 12/2002 |
| JP | 2003-218886 | 7/2003 |
| JP | 2003-258811 | 9/2003 |
| JP | 2004-248180 | 9/2004 |
| WO | WO 01/65719 A1 | 9/2001 |
| WO | WO 03/098383 A2 | 11/2003 |

* cited by examiner

APPARATUS AND METHOD FOR TRANSPARENT LAYER 2 ROUTING IN A MOBILE AD HOC NETWORK

CROSS-REFERENCE TO RELATED APPLICATION AND CLAIM OF PRIORITY

The present application is related to U.S. Provisional Patent No. 60/497,271, filed on Aug. 22, 2003, entitled "Transparent Layer-2 Routing for MANET". U.S. Provisional Patent No. 60/497,271 is assigned to the assignee of the present application and is hereby incorporated by reference into the present application as if fully set forth herein. The present application hereby claims priority under 35 U.S.C. §119(e) to U.S. Provisional Patent No. 60/497,271.

TECHNICAL FIELD OF THE INVENTION

The present invention relates generally to wireless networks and, more specifically, to method for transparently inserting a mobile ad hoc network (MANET) routing algorithm below the TCP/IP stack.

BACKGROUND OF THE INVENTION

Wireless network topologies that enable wireless nodes (i.e., mobile stations, wireless terminals) to communicate with each other and with fixed networks generally fall into two categories: i) infrastructure-based and ii) infrastructureless. Infrastructure-based networks have traditionally been based on the cellular concept and require a high level of infrastructure support. In an infrastructure-based network, wireless nodes communicate through access points (e.g., base stations) connected to the fixed network (e.g., Internet). Typical infrastructure-based networks include GSM networks, UMTS networks, CDMA networks, WLL networks, WLAN, and the like.

In an infrastructureless network, wireless nodes (i.e., mobile stations, wireless terminals) communicate directly rather than through access points or other base stations. One common and increasingly popular infrastructureless network topology is the mobile ad hoc network (MANET). A MANET is a group of wireless nodes that dynamically form a network with each other and without using any pre-existing fixed network infrastructure. In most cases, wireless nodes of a MANET are small mobile devices that are relatively limited in term of CPU capability, memory size, and power consumption.

Mobile ad hoc networks are expected to continue to grow over the next 2-3 years to become the dominant peer-to-peer communication technology. Cell phones are being equipped with IEEE-802.11 and other wireless LAN technologies. The proliferation of cell phones and the ubiquity of economical IEEE-802.11 networks will create a new kind of mobile, ad-hoc and peer-to-peer network.

As noted above, a mobile ad hoc network (MANET) can be set up without using a pre-existing network infrastructure. This can be done anywhere and at anytime. The wireless nodes of a MANET are connected by wireless links and are free to move randomly. The wireless nodes also act as routers. A MANET supports traffic types that are different from the traffic types typically found in an infrastructure-based wireless network. MANET traffic types include: 1) peer-to-peer traffic; 2) remote-to-remote traffic; and 3) dynamic traffic.

In peer-to-peer traffic, there is only one hop between the communicating wireless nodes (i.e., direct communication). In this instance, the network traffic (in bits/second) is usually constant. In remote-to-remote traffic, there are two or more hops between communicating wireless nodes, but a stable route is maintained between the source and destination nodes. This often occurs if several nodes stay within range of each other in one area or if the nodes move as a group. Dynamic traffic results when the MANET nodes move around and communication routes must be reconstructed. This often causes poor connectivity and network traffic occurs in short bursts.

Each MANET node is autonomous and may function as both a host and a router. Thus, each wireless node performs basic host processing and performs router switch functions. Thus, endpoints and switches are indistinguishable in a MANET. Since there is no central network to control network operations, control and management of a MANET is distributed among the wireless nodes. The MANET nodes cooperate to implement security and routing functions.

A MANET may implement different types of routing. Basic types of ad hoc routing algorithms are single-hop and multi-hop. These are based on different link layer attributes and routing protocols. A single-hop MANET is simpler than a multi-hop MANET, but lacks the functionality and flexibility of a multi-hip MANET. When delivering data packets from a source to its destination out of the direct wireless transmission range, the packets should be forwarded via one or more intermediate nodes.

Since MANET nodes are mobile, the radio frequency (RF) links may change rapidly and unpredictably over time. In order to compensate for traffic and propagation conditions, the MANET nodes dynamically modify routing information between each other as the nodes move, thereby forming new network, topologies. Advantageously, a MANET node may operate not only within the mobile ad hoc network, but also may access a public fixed network (e.g., cellular network).

MANET nodes may use, for example, an Ad Hoc On-Demand Distance Vector (AODV) routing protocol in ad hoc network environments in which the movement of the MANET nodes cause frequent changes in RF link quality. The AODV protocol enables the MANET nodes to adapt quickly to dynamic link conditions. The AODV algorithm enables dynamic, self-starting, multi-hop routing between mobile MANET nodes in an ad-hoc network. The AODV protocol enables the mobile MANET nodes to obtain routes for new destinations quickly and does not require the MANET nodes to maintain routes to destinations that are not in active communication. The AODV protocol provides quick convergence when the ad hoc network topology changes (e.g., a new MANET node joins the network).

The AODV protocol uses a destination sequence number for each route entry. The destination node creates a destination sequence number for any usable route information the destination node sends to a requesting node. Using destination sequence numbers ensures loop freedom (i.e., prevents loops). Given a choice between two routes to a destination MANET node, a requesting node always selects one with the greatest sequence number. Advantageously, when the AODV protocol detects an RF link breakage, the AODV protocol immediately transmits notifications only to the affected set of nodes. Other nodes are not notified.

Conventional MANET routing algorithms are implemented in MANET nodes as UDP application. Additionally, route information is propagated to TCP/IP stack of each host by modifying the interface to the kernel routing table. Thus, every Internet protocol (IP) packet (i.e., Layer 3 packet) must go through the routing UDP application. There are numerous disadvantages to the conventional methods of implementing MANET routing algorithms. Propagating route information to the TCP/IP stack requires modifications to the host TCP/IP stack. In most cases, however, the source code for the host TCP/IP stack is not available. The prior art methods also require the network interface of the MANET node to be assigned an IP address before the MANET node can become operational and learn about neighboring MANET nodes. Furthermore, because it is necessary to modify the kernel routing table, MANET routing protocols are implemented only on open-source Linux-based platforms. These MANET routing protocols are not implemented on Windows-based platforms.

Therefore, there is a need in the art for improved MANET routing algorithms nodes for use in mobile ad hoc networks. In particular, there is a need for an improved MANET routing algorithm that is not based on TCP/IP. More particularly, there is a need for a MANET algorithm that does not use TCP/IP to propagate route information.

SUMMARY OF THE INVENTION

The present invention discloses a novel method and a related apparatus for inserting a MANET routing algorithm transparently below the TCP/IP stack of a MANET node.

To address the above-discussed deficiencies of the prior art, it is a primary object of the present invention to provide, for use in a mobile ad hoc network formed by a plurality of mobile ad hoc network (MANET) nodes, a first MANET node capable of routing data packets using Layer 2 information. According to an advantageous embodiment of the present invention, the first MANET node comprises: 1) a radio frequency (RF) transceiver capable of wirelessly communicating with other ones of the plurality of MANET nodes; and 2) a controller capable of receiving incoming data packets from the RF transceiver and sending outgoing data packets to the RF transceiver, wherein the controller is further capable of receiving a first data packet from an Internet protocol (IP) layer associated with the first MANET node, determining a first medium access control (MAC) layer address associated with the first data packet, and adding the first MAC layer address to the first data packet.

According to one embodiment of the present invention, the controller determines the first MAC layer address associated with the first data packet by determining a first destination MANET node associated with the first data packet.

According to another embodiment of the present invention, the controller further determines the first MAC layer address associated with the first data packet by determining a first route coupling the first MANET node and the first destination MANET node.

According to still another embodiment of the present invention, the controller determines the first route by looking up the first route in a routing table associated with the first MANET node.

According to yet another embodiment of the present invention, the controller looks up the first route using an IP address associated with the first data packet.

According to a further embodiment of the present invention, the controller forwards the first data packet containing the first MAC-layer address to the first destination MANET node by transmitting the first data packet to a next sequential MANET node in the first route.

According to a still further embodiment of the present invention, the first MAC layer address is associated with the next sequential MANET node in the first route.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention and its advantages, reference is now made to the following description taken in conjunction with the accompanying drawings, in which like reference numerals represent like parts.

DETAILED DESCRIPTION OF THE INVENTION

FIGS. 1 through 4, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged mobile ad hoc network (MANET).

Figure 1:
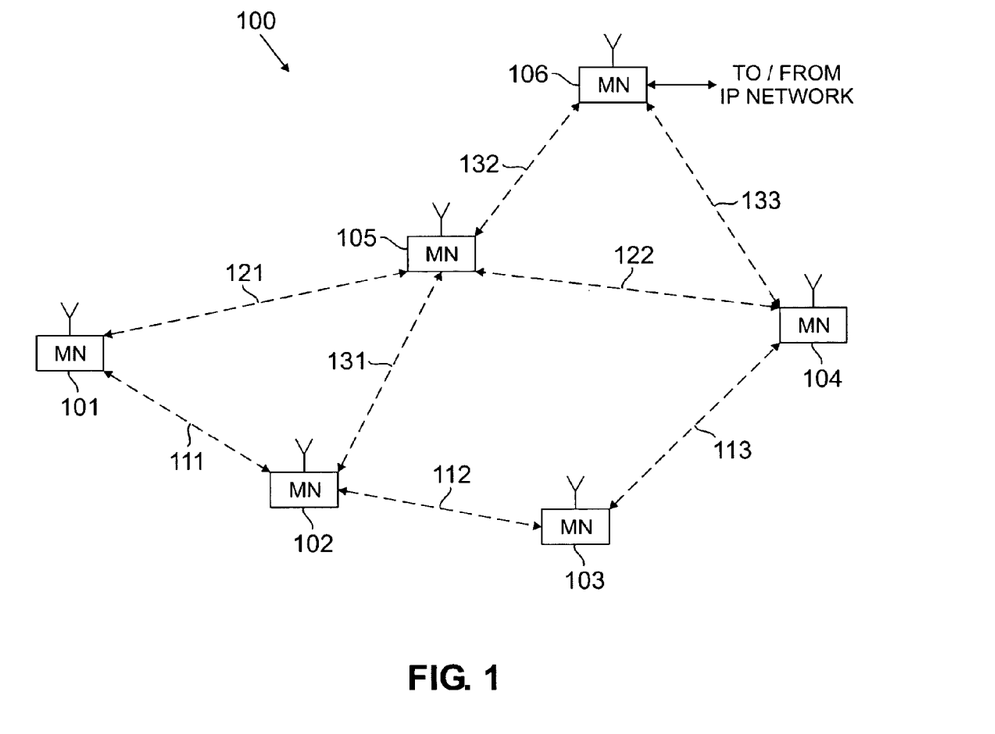
FIG. 1 illustrates an exemplary mobile ad hoc network (MANET) according to the principles of the present invention.

FIG. 1 illustrates exemplary mobile ad hoc network (MANET) 100 according to the principles of the present invention. MANET 100 comprises MANET nodes (MN) 101-106. Each one of MN 101-MN 106 is a conventional wireless terminal (e.g., cell phone, IEEE-802.11 device) that operates as a conventional MANET node. In an advantageous embodiment, at least some of MANET nodes 101-106 in MANET 100 may be multi-purpose wireless devices that can function in more than one type of wireless network. By way of example, MN 105 may comprise a dual-purpose transceiver that operates 1) as a CDMA2000 cell phone that accesses public cell phone networks; and 2) as an IEEE-802.11 wireless terminal that can operate in MANET 100.

Furthermore, at least one of MN 101-MN 106 may comprise a base station, access point, or other wireless terminal of a fixed infrastructure-based network, such as a cell phone network. For example, MN 106 may be an access point of an IEEE-802.11 wireless network that is coupled to a wireline Internet protocol (IP) network. Thus, MN 106 may function autonomously in MANET 100 or may act as an access point that allows, for example, MN 105 to access the Internet.

Each one of MANET nodes 101-106 is aware of the Internet protocol (IP) addresses of all of MANET nodes 101-106 and is capable of directly communicating with other ones of MANET nodes 101-106 via individual radio frequency (RF) links (or hops). The RF links (or hops) are shown as dotted lines in FIG. 1. MN 101 and MN 102 communicate via hop 111. MN 102 and MN 103 communicate via hop 112. MN 103 and MN 104 communicate via hop 113. MN 101 and MN 105 communicate via hop 121. MN 105 and MN 104 communicate via hop 112. MN 102 and MN 105 communicate via hop 131. MN 105 and MN 106 communicate via hop 132. MN 106 and MN 104 communicate via hop 133. Other hops may exist in MANET 100. However, for the sake of simplicity and clarity in explaining the present invention, these other hops are not shown.

The routes connecting a first MANET node and second MANET node may be specified in terms of the hops connecting the first and second MANET nodes. For example, MN 101 may communicate with MN 104 by a first route (Route A) comprising hops 121 and 122, by a second route (Route B) comprising hops 111, 112 and 113, and by a third route (Route C) comprising hops 111, 131, 132, and 133. Route A contains the least number of hops and Route C contains the greatest number of hops.

Figure 2:
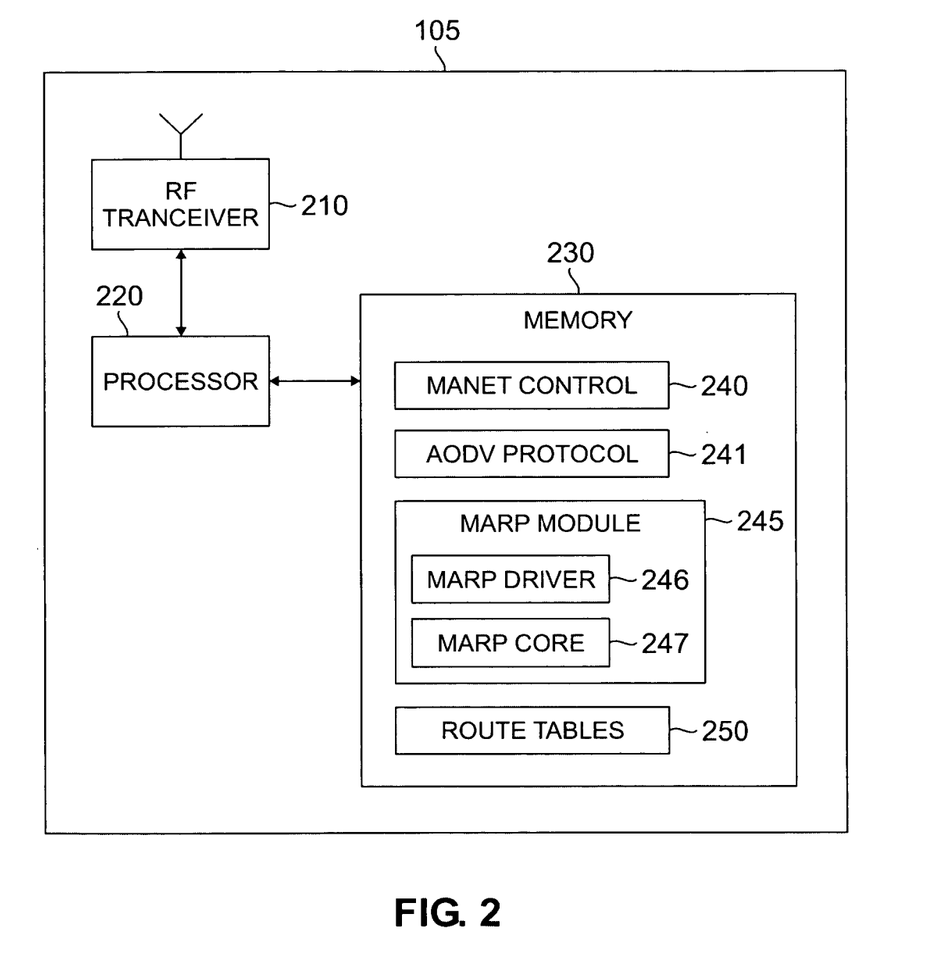
FIG. 2 illustrates an exemplary MANET node in greater detail according to one embodiment of the present invention.

FIG. 2 illustrates exemplary MANET node 105 in greater detail according to one embodiment of the present invention. MANET node (MN) 105 comprises radio frequency transceiver 210, data processor 220, and memory 230. Memory 230 stores MANET control program 240, AODV protocol algorithm 241, MANET routing protocol (MARP) module 245, and Route Tables 250, among other things. MARP module 245 comprises MARP driver 246 and MARP core thread 247. Data processor 220 executes the instructions in MANET control program 240, which provides overall control for the operations of MANET node 105. Together, data processor 220 and memory 230 form a controller that implements the present invention in MANET node 105.

When MANET node 105 is operating in MANET 100, data processor 220 builds Route Tables 250 by storing route information received from neighboring MANET nodes. Under the control of AODV protocol algorithm 241, data processor 220 builds Route Tables 250 using conventional AODV protocol messages, such as the Route Request (RREQ) message, the Route Reply (RREP) message, the Route Error (RERR) message, the Route Reply Acknowledgment (RREP ACK) message, and the like.

AODV protocol algorithm 241 is capable of both unicast and multicast routing. AODV protocol algorithm 241 builds a route between MANET nodes only when requested by a source node. AODV protocol algorithm 241 maintains each route only for as long as the source node needs the route. AODV protocol algorithm 241 uses sequence numbers to ensure the freshness of routes. The route information for each route in Route Table 250 typically includes Destination IP Address, Destination Sequence Number, Valid Destination Sequence Number flag, Hop Count (number of hops need to reach destination), Next Hop, and a list of Precursor nodes, among other data values.

According to the principles of the present invention, data processor 220, under the control of MANET control program 240, is capable of propagating routing information to other nodes using Layer 2 messages. Thus, it is not necessary to use TCP/IP (i.e., Layer 3) to route information. The present invention comprises an outbound software module associated with MANET control program 240 that intercepts all outbound data packets from the Internet protocol (IP) layer (i.e., Layer 3 of the ISO network model). The present invention further comprises a similar inbound software module associated with MANET control program 240 that intercepts all inbound data packets from MANET 100 (i.e., an Ethernet). According to an advantageous embodiment of the present invention, MANET control program 240, AODV protocol algorithm 241, and MARP module 245 are Linux-based and the inbound software module and the outbound software module may be implemented on the Linux kernel as loadable kernel modules.

Figure 3:
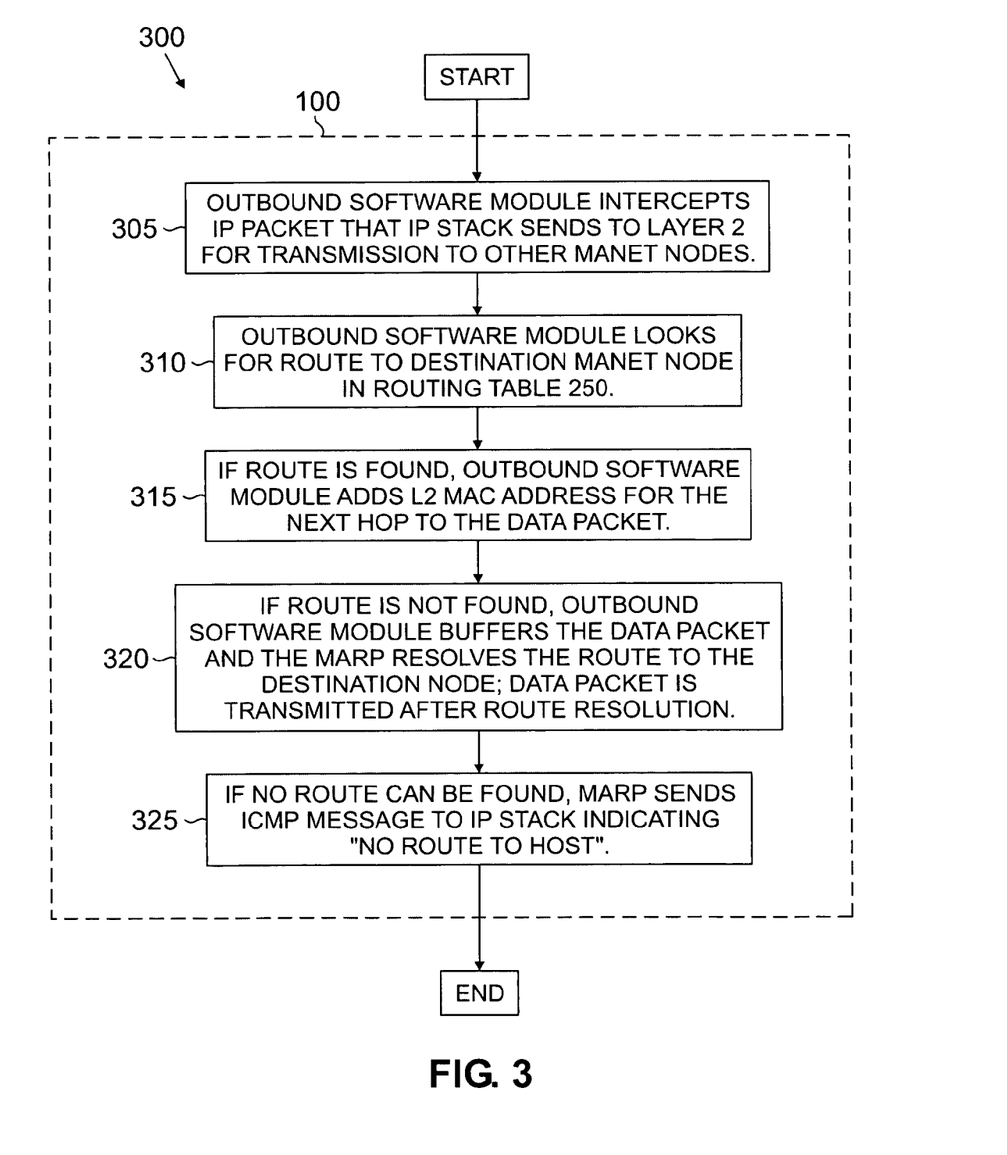
FIG. 3 is a flow diagram illustrating the processing of outbound data packets in the exemplary MANET node according to an exemplary embodiment of the present invention.

FIG. 3 depicts flow diagram 300, which illustrates the processing of outbound data packets in MANET node 105 according to an exemplary embodiment of the present invention. When the IP stack associated with MANET control program 240 sends an IP data packet to Layer 2 for transmission to other MANET nodes, the outbound software module intercepts the IP packet (process step 305). The outbound software module then examines Routing Table 250 in MANET node 105 for the route to the destination MANET node (process step 310). If the outbound software module finds an existing route, the outbound software module adds to the data packet the link layer (or Layer 2) medium access control (MAC) address of the next hop and queues the data packet for transmission (process step 315).

If an existing route is not found in Route Table 250, the data packet is buffered and the MANET Routing Protocol (MARP) is asked to resolve the route to the destination. In the exemplary embodiment shown in FIG. 2, the MARP may use AODV protocol algorithm 241. The buffered data packet is transmitted by the MARP after the route resolution to the destination node is complete (process step 320). If no route can be found by the MARP, an ICMP message is sent from the MARP to the IP stack to indicate "No Route to Host" (process step 325).

Figure 4:
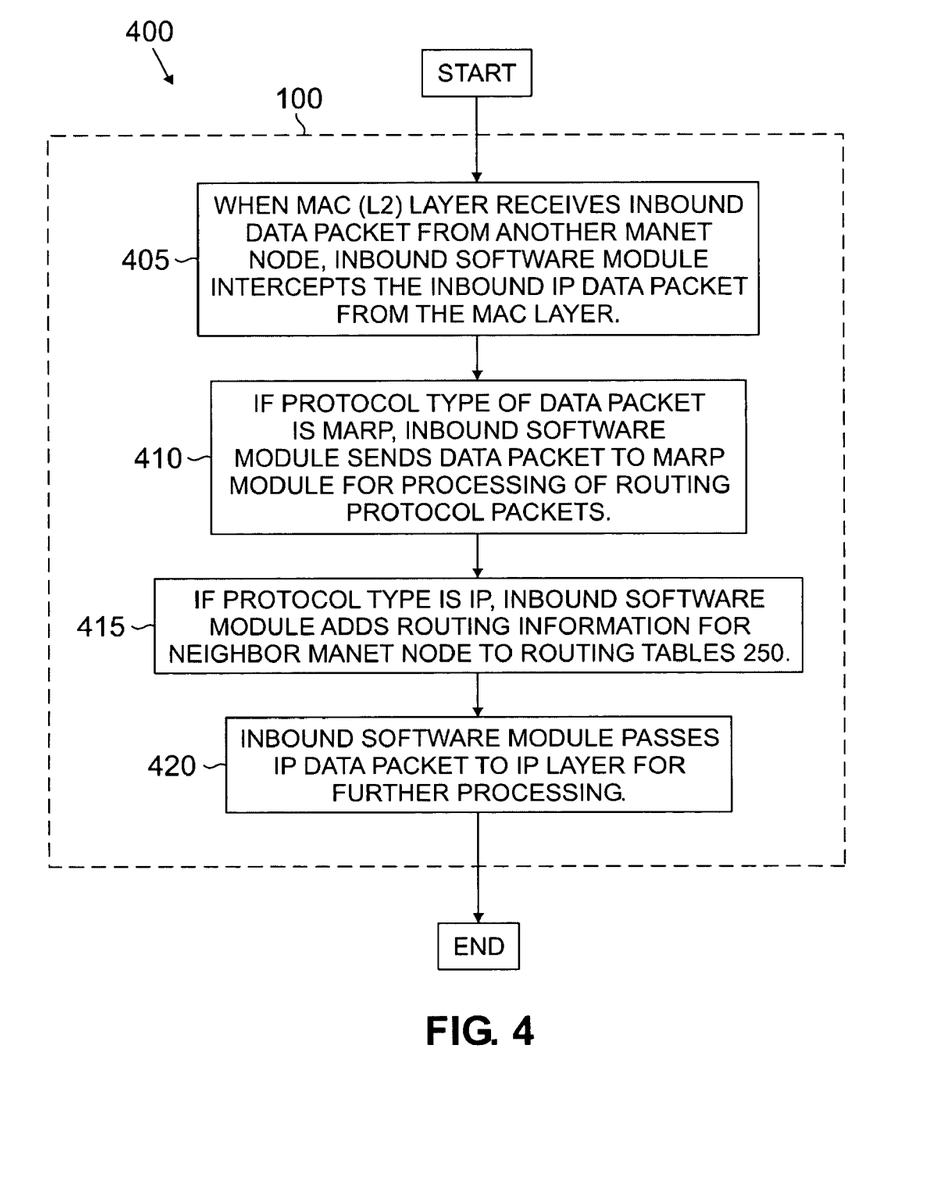
FIG. 4 is a flow diagram illustrating the processing of inbound data packets in the exemplary MANET node according to an exemplary embodiment of the present invention.

FIG. 4 depicts flow diagram 400, which illustrates the processing of inbound data packets in MANET node 105 according to an exemplary embodiment of the present invention. When the medium access control (MAC) layer (i.e., L2) receives an inbound data packet from another MANET node in MANET 100, the inbound software module associated with MANET control program 240 intercepts the inbound IP data packet from the MAC layer (process step 405). If the protocol type in the data packet is "MARP", the inbound software module sends the data packet to the MARP module for processing of routing protocol packets (process step 410). If the protocol type is "IP", the inbound software module learns about the neighbor MANET node that sent the IP packet and adds the routing information to Routing Table 250 (process step 415). Next, the inbound software module passes the IP data packet to the IP layer for further processing (process step 420).

Advantageously, the methods described above in FIGS. 3 and 4 do not require any changes to the TCP/IP stack or to the device drivers in MANET node 105. Thus, the MANET routing algorithm can truly be a transparent extension to the host on which it is running.

According to an advantageous embodiment of the present invention, MARP module 245 comprises MARP driver 246, which is a MARP-to-Linux interface, and MARP core thread 247, which is executed as a Linux kernel thread. MARP driver 246 registers with the Linux kernel for MARP protocol (dev_add_pack), links with the Ethernet driver for all outbound IP packets, and uses the Linux kernel timer services. The MARP protocol registration helps to receive all MARP inbound packets by MARP driver 245, which are relayed to MARP core thread 247. Linking to the Ethernet drivers captures all outbound IP data packets. MARP driver 246 queues the IP packet that is processed by MARP core thread 247. This is realized by linking the Hard_Header and Hard_Start_Xmit function pointers of the net device.

MARP driver 246 does not have a net device. Instead, MARP driver 246 uses the net device of the MAC layer. MARP driver 246 also updates the MAC driver parameters like MTU, Header Length, and Device Flag to disable ARP. MARP driver 246 registers with the program kernel for event notifications. MARP driver 246 is aware of the various events (e.g., interface up, interface down, etc.) and performs the required actions affecting the MARP.

The routing functionality is performed in Layer 2 software. Route discovery and routing of the data packets to the destination also occurs in Layer 2. The IP layer is transparent to the presence of MARP driver 246 in Layer 2. The two function pointers, Hard_Header and Hard_Start_Xmit, linked to the Net_Device structure of the MAC interface perform the functions of inserting the MARP header, populating the routing information and the destination MAC address.

The Hard_Header function, called from IP's context, inserts an empty 12-byte MARP header. The MARP header for data packets contains information to route the data packet at Layer 2. The device transmit function (Hard_Start_Xmit) fills in the MARP header and also looks up the route for the destination. This function calls the actual Hard_Header function of the device and also the Hard_Start_Xmit function of the device to which the destination address is specified from the MARP routing table.

Another change to the Net_Device is disabling the Hard_Header_Cache value. The MTU is changed (12 byte less) and the network layer is indicated about the MTU change. The Hard_Header_Len value is changed to accommodate the MARP header (12 bytes) and the Device Flag value is changed to disable ARP.

Upon receipt of the MARP packets, if the packet is destined to the host, the receive (RX) function of MARP driver 246 (registered through dev_add_pack) strips the MARP header, updates Routing Tables 250, and passes the packet to the IP layer. Otherwise, the data packet is forwarded at Layer 2.

When the MARP module is removed, it performs cleanup and de-registers from the Linux kernel (Dev_Remove_Pack). The cleanup operation involves restoring the original Hard_Header and Hard_Start_Xmit function pointers of the device and restoring the MTU, Header Length, and device flags.

Advantageously, by inserting the MANET routing algorithm transparently below the TCP/IP stack, the present invention does not require changes to the host TCP/IP stack. As a result, MARP may be ported to any platform (e.g., Windows), without requiring any modifications to the OS Kernel. Furthermore, since the present invention intercepts inbound data packets from the L2 layer, it can learn about neighboring MANET nodes and the topology without using invasive means and without requiring an IP address to be assigned to the network interface. The method of the present invention may be applied to any Ad Hoc routing algorithm on any OS.

MARP driver 246 does not create a new net device. MARP driver 246 uses the service of Ethernet's net device. MARP driver 246 may be implemented as an easily installable module (e.g., plug and play) that may also be removed without affecting the kernel. Advantageously, the present invention decreases round trip delay time, due to routing at Layer 2, below the IP layer.

Although the present invention has been described with an exemplary embodiment, various changes and modifications may be suggested to one skilled in the art. It is intended that the present invention encompass such changes and modifications as fall within the scope of the appended claims.

What is claimed is:

1. For use in a mobile ad hoc network formed by a plurality of mobile ad hoc network (MANET) nodes, a first MANET node capable of routing data packets, said first MANET node comprising:
   a radio frequency (RF) transceiver capable of wirelessly communicating with other ones of said plurality of MANET nodes; and
   a controller capable of receiving incoming data packets from said RF transceiver and sending outgoing data packets to said RF transceiver, wherein said controller is further capable of implementing, with a MANET Routing Protocol module, a MANET routing protocol at a medium access control (MAC) layer by, at the MAC layer, (i) intercepting a first data packet associated with at least one of the incoming data packet and the outgoing data packet, (ii) determining a first MAC layer address associated with said first data packet, and (iii) adding said first MAC layer address to said first data packet.

2. The first MANET node as set forth in claim 1 wherein said controller determines said first MAC layer address associated with said first data packet by determining a first destination MANET node associated with said first data packet.

3. The first MANET node as set forth in claim 2 wherein said controller further determines said first MAC layer address associated with said first data packet by determining a first route coupling said first MANET node and said first destination MANET node.

4. The first MANET node as set forth in claim 3 wherein said controller determines said first route by looking up said first route in a routing table associated with said first MANET node.

5. The first MANET node as set forth in claim 4 wherein said controller looks up said first route using an IP address associated with said first data packet.

6. The first MANET node as set forth in claim 3 wherein said controller forwards said first data packet containing said first MAC layer address to said first destination MANET node by transmitting said first data packet to a next sequential MANET node in said first route.

7. The first MANET node as set forth in claim 6 wherein said first MAC layer address is associated with said next sequential MANET node in said first route.

8. The first MANET node as set forth in claim 6 wherein said controller is further capable of receiving a second data packet from a medium access control (MAC) layer associated with said first MANET node and determining if said second data packet contains a MAC layer address associated with said first MANET node.

9. The first MANET node as set forth in claim 8 wherein said controller, in response to a determination that said second data packet does contain a MAC layer address associated with said first MANET node, routes said second data packet to a second destination MANET node.

10. The first MANET node as set forth in claim 9 wherein said controller, in response to a determination that said second data packet does not contain a MAC layer address associated with said first MANET node, stores Internet protocol (IP) information associated with said second data packet in a routing table associated with said first MANET node.

11. For use in a mobile ad hoc network formed by a plurality of mobile ad hoc network (MANET) nodes, a method of routing data packets in a first MANET node comprising the steps of:

implementing a MANET Routing Protocol module to:

at a medium access control (MAC) layer, intercepting a first data packet associated with at least one of an incoming data packet and an outgoing data packet;

at the MAC layer, determining a first MAC layer address associated with the first data packet; and         at the MAC layer, adding the first MAC layer address to the first data packet.

12. The method as set forth in claim 11 wherein the step of determining the first MAC layer address associated with the first data packet comprises the sub-step of determining a first destination MANET node associated with the first data packet.

13. The method as set forth in claim 12 wherein the step of determining the first MAC layer address associated with the first data packet further comprises the sub-step of determining a first route coupling the first MANET node and the first destination MANET node.

14. The method as set forth in claim 13 wherein the sub-step of determining the first route comprises the sub-step of looking up the first route in a routing table associated with the first MANET node.

15. The method as set forth in claim 14 wherein the sub-step of looking up the first route uses an IP address associated with the first data packet.

16. The method as set forth in claim 13 further comprising the step of forwarding the first data packet containing the first MAC layer address to the first destination MANET node by transmitting the first data packet to a next sequential MANET node in the first route.

17. The method as set forth in claim 16 wherein the first MAC layer address is associated with the next sequential MANET node in the first route.

18. The method as set forth in claim 16 further comprising the steps of receiving a second data packet from a medium access control (MAC) layer associated with the first MANET node and determining if the second data packet contains a MAC layer address associated with the first MANET node.

19. The method as set forth in claim 18 further comprising the step, in response to a determination that the second data packet does contain a MAC layer address associated with the first MANET node, of routing the second data packet to a second destination MANET node.

20. The method as set forth in claim 19 further comprising the step of, in response to a determination that the second data packet does not contain a MAC layer address associated with the first MANET node, of storing Internet protocol (IP) information associated with the second data packet in a routing table associated with the first MANET node.

\* \* \* \* \*